June 15, 1965 E. C. FOX, JR., ETAL 3,189,195
LOAD MANEUVERING APPARATUS
Filed Jan. 25, 1963
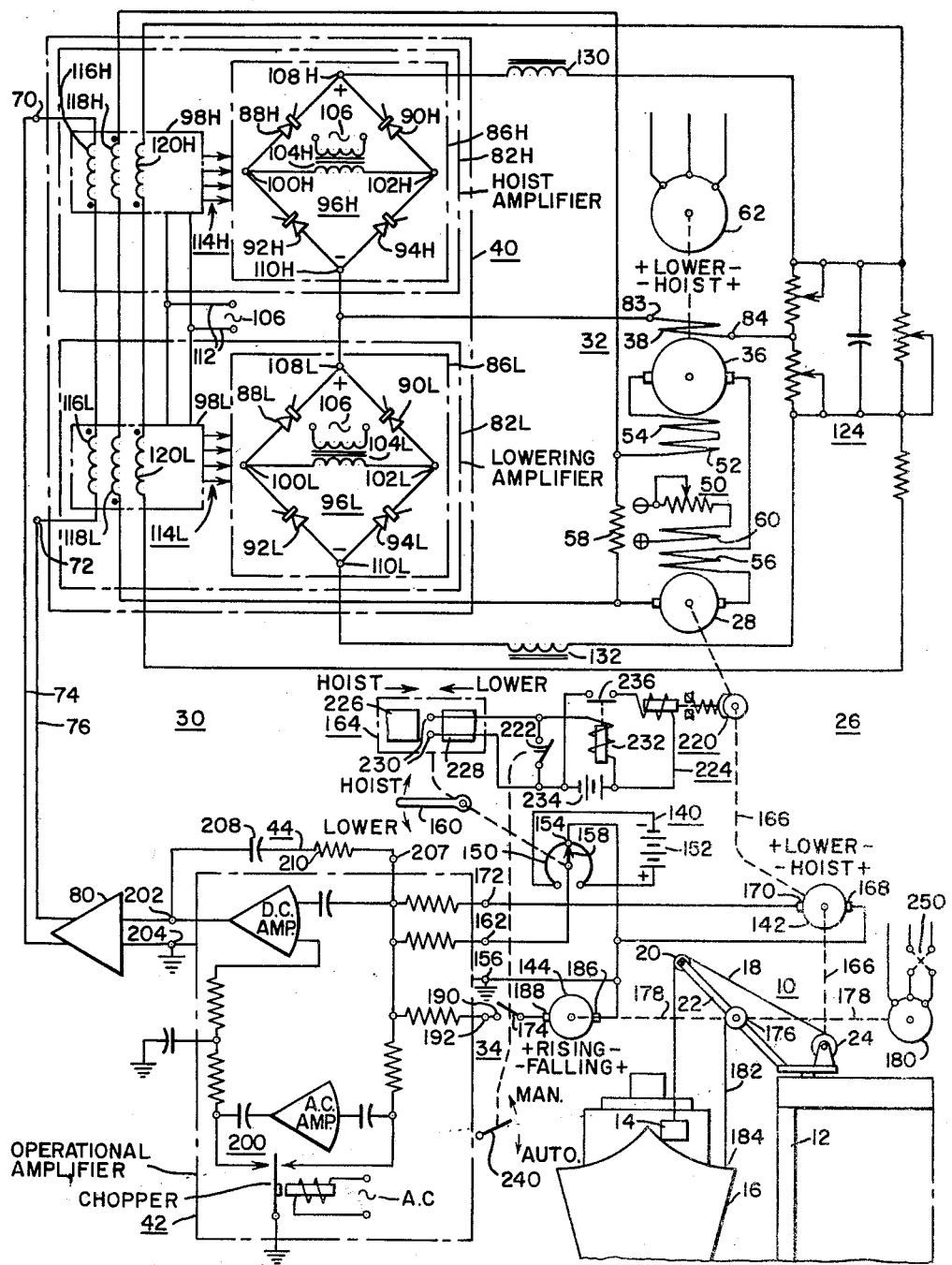
WITNESSES:
Bernard R. Gieque
James F. Young
INVENTORS
Edgar C. Fox, Jr. and
Richard L. Meyer.
BY
Clement J. Pocynokas
ATTORNEY

United States Patent Office 3,189,195
Patented June 15, 1965

3,189,195
LOAD MANEUVERING APPARATUS
Edgar C. Fox, Jr., Penn Township, Allegheny County, and Richard L. Meyer, Plum, Pa., assignors to Westinghouse Electric Corporation, Pittsburgh, Pa., a corporation of Pennsylvania
Filed Jan. 25, 1963, Ser. No. 253,801
13 Claims. (Cl. 214—14)

This invention relates to apparatus for maneuvering, i.e., holding, positioning or moving, a load between two stations which are subject to relative movement between each other. This invention is particularly useful in maintaining a constant position or constant velocity of a load being held or transferred between a floating vessel and another station such as a dock, another floating vessel, an underwater structure, the bottom of the sea, or any other selected reference point.

The present invention is an improvement over apparatus of the general type disclosed and broadly claimed in a United States patent application, Serial No. 253,809 entitled "Load Maneuvering Apparatus," and filed concurrently herewith by W. C. Carl and H. Zollinger, and assigned to the same assignee.

When a load is being lifted from a ship's deck by a crane located on the dock, if the crane operator misjudges the ship's position due to wave movement and hoist speed, the ship may rise on the wave and hit the load before it is clear. On the other hand, when a load is being placed on the ship the operator must try to judge the roll and pitch of the ship, or the load may hit the deck too hard. In either case damage to both the load and ship is possible.

For convenience, the station on which the load moving apparatus such as a crane is located, will be referred to as the "active" station, while the other station will be referred to as the "passive" station. In the ship and dock example, the dock is the active station if the crane is on the dock. The ship in that case is the passive station.

The present invention contemplates apparatus for controlling the movement of a load between two stations to control the load to desired instantaneous position and a constant velocity relative to the passive station while the stations are subject to relative movement between each other. This may include the case where the desired constant velocity is zero, in which case the position of the load is held constant relative to the passive station.

In the above-mentioned concurrently filed case, there is disclosed load transfer apparatus controlled in response to the difference between the actual and desired speeds of relative movement between the load and the passive station, that is that station to or from which a load is being moved by apparatus on another station. This is effected in the specific embodiment described in that case by resultant control forces produced from a desired load speed signal, an actual load speed signal, and a signal which is proportional to the speed of the relative motion between the stations. Accuracy and speed of response are significantly increased in accordance with the present invention by controlling load transfer apparatus in response to the difference between actual and desired speeds of relative movement between the load and the passive station and the difference between the actual and desired instantaneous position of the load to the passive station. This is effected generally under the invention by control in response to the difference between the actual and desired speeds of relative movement between the load and the passive station and the integral of this difference thereby providing both speed and position error control.

In accordance with one embodiment of the present invention this is accomplished by summing in the input circuit to an operational amplifier, a signal representing desired speed of load relative to the passive station, a signal representing the actual load speed relative to the active station, and a signal representing the speed of relative motion between the stations, then feeding the output of the amplifier back to its input through an integrating feedback circuit, and employing the bidirectional output of the amplifier to control a bidirectional supply circuit to a reversible load transfer motor.

It is therefore an object of the present invention to provide in apparatus of the character described, improved means for compensating for the relative motion between two stations between which a load is being positioned or transferred.

Another object of the invention is to provide improved apparatus for transferring a load between two relatively moving stations at a constant desired velocity relative to the passive station.

Another object is directed to substantially eliminating the effect of relative motion between two load transfer stations on the velocity of the load relative to the passive station.

A further object is to maintain a desired position of the load relative to the passive station.

Other objects and advantages of the present invention will be apparent from the following description taken in connection with the accompanying drawing, wherein there is illustrated a preferred form of the invention as embodied in a hoist system for transferring loads between a dock and a floating vessel.

In the drawing there is shown a diagrammatic representation of a crane 10 mounted on a dock 12 for transferring a load 14 between the dock and a floating vessel 16. The crane includes a load lifting cable 18 reeved around a sheave 20 on the outer end of a boom 22 and reeled on a drum 24 driven by reversible drive 26. The drive 26 includes a motor 28 mounted on the crane and a control system 30 for controlling the speed and direction of the motor, and thereby of the load movement.

By way of example the motor 28 is shown as a direct current motor, and the control system therefor is shown as including a reversible power supply 32 for supplying power to the motor, and a control network 34 for controlling the power supply 32 in response to errors of relative position and the speed of relative movement between the load 14 and the ship 16. The power supply 32 shown by way of example includes a generator 36 with a main field 38 excited by a reversible output amplifier 40 controlled by the control network 34. The control network 34 includes a summing and integrating arrangement in the form of an operational amplifier 42 with an integrating feedback 44 therearound, and sources of various control signals supplied to the summing input of the operational amplifier.

The armatures of the motor 28 and generator 36 are connected in a loop circuit 50 which also includes series and commutating fields 52 and 54 of the generator, a motor commutating field 56 and a dropping resistor 58 for sampling the armature current in the loop 50. Motor 28 has a shunt field 60 connected to a suitable D.C. source. Generator 36 is part of an MG set including a motor 62 which drives the generator. By way of example, motor 62 is shown as an A.C. motor connected to a suitable three-phase A.C. source.

The direction and speed of rotation of motor 28 is dependent on the polarity and amplitude respectively of the voltage output of generator 36. Motor 62 drives the generator at substantially constant speed, and the polarity and amplitude of the generator output are controlled and adjusted by controlling the polarity and amplitude of the voltage supplied to the generator field 38 by the bi-directional amplifier 40.

Amplifier 40 is of the type which provides a reversible output having a polarity and magnitude dependent on the polarity and magnitude of the net input to the amplifier. In response to an input signal of one sense the amplifier provides an output of one polarity while an input of opposite sense provides an output of opposite polarity. The amplifier is provided with input terminals 70 and 72 which receive input signals along lines 74 and 76 from the control network 34 as amplified by a bidirectional amplifier 80.

By way of example amplifier 40 is shown as having two single-ended channels 82H and 82L whose outputs are oppositely poled across the common output terminals 83 and 84. The inputs of amplifiers 82H and 82L are connected to the common input terminals 70 and 72 in an arrangement whereby a common signal of a given polarity along lines 74 and 76 of a given polarity affects both amplifiers in opposite manner, that is, a signal of a particular polarity drives one of the amplifiers up while tending to drive the other amplifier down or deeper into cutoff, and vice versa in response to a signal of opposite polarity. With both amplifiers biased to cutoff at quiescent, a signal of given polarity turns one amplifier on and holds the other amplifier off or turns it off as the case may be. Since the exemplary arrangement of amplifiers 82H and 82L is such that the output of amplifier 82H is in a direction to ultimately cause motor 28 to rotate in the hoist direction, and the output of amplifier 82L is of the polarity which ultimately causes motor 28 to rotate in the lowering direction, amplifiers 82H and 82L are labeled hoist and lower amplifiers respectively, and corresponding components in both amplifiers are indicated by the same reference numeral suffixed however by the letter H or L to indicate their association with either the hoist or lowering amplifier.

Each of amplifiers 82H and 82L includes two sections, a converter section 86 having gate controlled switching devices 88, 90, 92 and 94 connected in a full wave rectifier bridge arrangement 96, and a firing circuit section 98 for producing gating signals which are applied to the gating circuits of devices 88, 90, 92 and 94 to condition the switching devices to fire at a desired phase angle in response phase commutation by alternating current supplied to the input of the bridge.

Devices 88, 90, 92 and 94 are of the type which have a conduction state responsive to a gating signal, for example, silicon controlled rectifiers as shown. Across one diagonal thereof, the bridge 96 is provided with A.C. input terminals 100 and 102 to which is connected the secondary of a transformer 104 whose primary is connected to a source of alternating current 106. The bridge 96 is further provided with positive and negative D.C. output terminals 108 and 110 respectively. The D.C. output terminals of the bridge also constitute the output terminals of the amplier 82.

To provide the proper operating time relations, the gate signal generator 98 is supplied with alternating current input power along lines 112 from the A.C. source 106 which also supplies transformer 104. The gate signal generator 98 produces output pulses on four output lines 114 whose (pulses) phase positions are determined by the output of a magnetic amplifier included in the generator 98. Each output line 114 is connected to a different one of the switching devices 88, 90, 92 and 94. In turn the output of the magnetic amplifier is determined by its core saturation. Included in the signal generator 98 are control windings 116, 118 and 120 which control the degree of core saturation in the magnetic amplifier in accordance with the summation of signals applied to the windings.

Polarity dots are shown at one end of each control winding and indicate that current flowing into the dotted end of the winding as a result of positive voltage applied to that end of the winding tends to drive the magnetic amplifier in the gating generator 98 toward positive saturation thereby tending to increase the output of the amplifier. On the other hand, current entering the undotted end of a winding as a result of positive voltage applied to that end of the winding tends to drive the magnetic amplifier toward negative saturation thereby tending to drive the amplifier downward toward cutoff or further into cutoff as the case may be (depending on operating or bias point).

Windings 116H and 116L are connected in series with each other and across the input terminals 70 and 72 connected to lines 74 and 76 of the control network 34 output lines. As indicated by the polarity dots, windings 116H and 116L have oppositely related effects on their respective associated gating circuits 98H and 98L in response to a signal of given polarity applied across input terminals 70 and 72. A given input signal will drive one of the amplifiers up while driving the other one down or further into cutoff. Thus windings 116H and 116L may be variously referred to as being oppositely poled, or in series opposition, or in push-pull relation to a common signal applied to the two windings.

Windings 118H and 118L are negative feedback windings connected in series opposition with each other in a circuit connected across resistor 58, and thus are responsive to the voltage drop across resistor 58 which in turn is responsive to the armature current in the loop 50. Thus windings 118H and 118L constitute current feedback windings providing current negative feedback to form a current regulated system for improved stability.

Windings 120H and 120L are damping negative feedback windings. They are oppositely poled in series and together are across a rate feedback network 124 connected in the output circuit of the power supply 40 to respond to the rate of change of power supplied to the generator main field winding 38. Reactors 130 and 132 are connected in the output circuit of the power supply 40 at terminals 108H and 110L respectively. These reactors limit the circulating current due to the instantaneous difference of the output voltage of amplifiers 82H and 82L.

It should be understood that each of the windings 116, 118 and 120 may represent one or more windings tending toward the same result in the associated amplifier.

According to the convention adopted herein, when the magnetic amplifier in the gating circuit 98 is driven to some degree of saturation in response to a positive signal applied to the dotted end of the input winding 116, firing pulses are provided on output lines 114 connected respectively to switching devices 88, 90, 92 and 94. When the magnetic amplifier is driven up by an input signal on winding 116, the gating circuit 98 provides gating pulses to the devices 88, 90, 92 and 94 so synchronized that devices 88 and 94 fire at a selected angle during one-half cycle of the A.C. supply while devices 90 and 92 fire at the same angle during the other half cycle of the A.C. supply, thus producing a full wave direct current output at the terminals 108 and 110. It will be appreciated that the "same angles" during opposite half cycles are 180° apart. The average D.C. output is dependent on the firing angle, which is determined by the drive of the magnetic amplifier.

The type of amplifier shown by way of example for amplifier 82 is described in greater detail in the copending U.S. patent application, Serial No. 43,515, filed on July 18, 1960 by Emil T. Schonholzer, and assigned to the same assignee as the present application. The reversible power supply 32 is shown and described in greater detail in AIEE Paper No. DP62-1019 entitled "Semiconductor Control for Excavating Equipment," and presented by A. M. Vance at the AIEE Empire Tri-District, Erie, Pennsylvania, on May 16, 1962, and in a similar article in the July 1962 issue of Mechanization, pages 37–42.

The polarity and response relations of the reversible power supply 32 are so arranged that a positive signal applied to the input terminal 72 will drive amplifier 82H to supply power to the generator main field winding 38 in the proper direction to cause the hoist motor 28 to rotate in the hoisting direction. On the other hand, a negative signal applied to input terminal 72 drives amplifier 82L to apply power to the generator main field winding 38 in such direction as to cause motor 28 to rotate in the lowering direction.

The control network 34 includes a command or desired speed signal source, 140, an actual load speed signal source 142, a ship's motion signal source 144, a summing circuit, for example operational amplifier 42, for summing these signals, an integrating arrangement, for example the integrating feedback 44 around amplifier 42, for integrating the summation of these signals, and amplifier 80 for amplifying the sum and integration.

The signal source 140 supplies to the summing circuit a desired speed reference or command signal A, representing a desired direction and speed of the load 14. In the command signal source 140 there is a split potentiometer 150 connected across a D.C. source, for example the battery shown at 152. A fixed center tap 154 on the potentiometer is connected to a common input terminal 156 of amplifier 42. The potentiometer 150 is provided with a movable wiper contact 158 mechanically linked to a master controller handle 160, and electrically connected to an input terminal 162 of amplifier 42. The controller handle 160 also operates a drum switch 164 in unison with the potentiometer arm 158.

When the potentiometer arm 158 is moved to the hoist side (right of tap 154) by the control handle 160, a positive voltage is applied to terminal 162. On the other hand, when the arm 158 is moved to the lowering side, (left of tap 154) a negative voltage is applied to terminal 162. The magnitude of the output voltage of source 140, adjustable by means of handle 160, is selected to correspond to the desired speed of the motor and hence load movement relative to the ship (passive station). Thus the speed and direction of load movement relative to the passive station will be dependent on the magnitude and polarity respectively of the voltage supplied by source 140, which in turn is dependent on the position of the potentiometer arm 158 as determined by the handle 160.

A signal B, representing the actual speed of the load 14 relative to the crane 10, is injected into the summing circuit by a D.C. tachometer 142, which is mechanically coupled to the output shaft 166 of the hoist motor 28. This tachometer provides an output voltage with a magnitude proportional to the motor speed and a polarity dependent on the direction of motor rotation. In the particular arrangement shown, and as indicated by the legends over the tachometer 142, the tachometer generates a positive voltage at its output terminal 168 when the hoist motor 28 is hoisting, and a negative voltage at terminal 168 when the hoist motor 28 is lowering. Output terminal 168 of tachometer 142 is connected to the common input terminal 156 of the summing amplifier 42 while the other output terminal 170 of the tachometer 142 is connected to a summing input 172 of amplifier 42.

The ship's motion reference source 144, when connected into the summing arrangement by a switch 174, supplies to the summing circuit a signal C, which is proportional to the velocity of the relative vertical movement between the ship 16 (passive station) and the crane 10 (active station). Source 144 may, for example, be the tachometer shown and mechanically driven by a drum 176 rotatably mounted on the crane boom 22. Common shafting 178, through which the tachometer 144 is driven by the drum 176, is also coupled to the rotor shaft of a torque motor 180. The torque motor may be of the type having a wound rotor with adjustable rotor resistors to adjust the torque. Attached to and wound around the drum 176 is a length of cable 182 the free end of which is "fixed" to the ship at 184, for example by merely attaching sufficient weight to the end of the line to hold the line in tension against the torque of the torque motor 180. As the ship rises and falls, the free end of the line at 184 remains "fixed" relative to the ship while the rest of the line is held at constant tension as it winds and unwinds on and off the drum. Thus, the tachometer 144 is rotated in one or the other direction depending on the direction of the vertical motion of the ship, and in response to such rotation the tachometer generates a voltage of one or the other polarity depending on the ship's movement. The polarity of such a signal will be dependent upon the direction of the relative movement between the vessel and the dock, while the magnitude of the signal will be proportional to the speed of such relative movement. In the specific arrangement shown by way of example, and as appears in the legends underneath the tachometer 144, this tachometer produces a positive voltage at its output terminal 186 when the ship is falling (as into a wave trough), and a negative voltage at terminal 186 when the ship is rising (as onto the crest of a wave).

It should be appreciated that this is a diagrammatic showing for ease of illustration, and that as a practical matter the tachometer 144, the drum 176, and the torque motor 180 would be located on the crane platform while the cable 182 is passed around a pulley on the boom.

The output terminal 186 of the tachometer 144 is connected to the common input terminal 156 of amplifier 42, while the other output terminal 188 of the tachometer 144 is connected to the arm of switch 174, the other contact 190 of the switch being connected to a summing input terminal 192 of the summing amplifier 42.

Amplifier 42 may be any suitable summing D.C. amplifier. For the most accurate results, it is most desirable that the amplifier 42 be as drift free as possible. To this end and by way of example, amplifier 42 is shown as a chopper stabilized D.C. operational amplifier. Chopper stabilization is accomplished in the well known manner by means of an A.C. amplifier and chopper as shown at 200. The output of amplifier 42 appears at output terminals 202 and 204 and is applied for further amplification to amplifier 80, whose output appears on lines 74 and 76 as the output of the control network 34. The feedback integrating network 44 is connected from the output terminal 202 to an input terminal 207 of the amplifier 42 so that the output of amplifier 42 appearing on its output terminals 202 and 204 includes the summation of the input signals and also the integral of the summation of these signals. The integrating feedback circuit 44 includes a capacitor 208 and a resistor 210.

With the capacitor 208 connected as shown, and resistors being connected as shown in the various input lines to the amplifier input, the operational amplifier performs as an integrator which provides an output that is proportional to its input plus the integral of its input.

The polarity relations of the various signals supplied to the summing circuit are such that the command or desired speed reference signal A from the command source 140 for any given command direction is opposed in the summing circuit by the actual motor speed signal B produced by the tachometer 142 when the motor is rotating in the command direction.

With the switch 174 closed, the ship's motion reference tachometer 144 supplies a signal C to the summing circuit which aids the command signal A from the source 140 when the relative movement of the ship and the crane is in the direction tending to oppose the purpose of the command signal A, and which signal C opposes signal A when the direction of relative movement between the ship and the crane aids the purpose of the command signal A. It should be apparent that a falling ship opposes the purpose of a lowering command, while a rising ship aids the purpose of a lowering command. Also, a hoist command is opposed by a rising ship, and aided by a falling ship. These relations reverse when the position of the crane is reversed, that is when the crane is on the ship. In the latter case a dipping crane boom aids the purpose of a lowering command, while a rising crane boom opposes the purpose of a lowering command. Also, with the crane on the ship, a hoist command is aided by a rising crane boom, and opposed by a dipping crane boom.

The summing circuit 42 is so arranged that a positive signal on any of summing input terminals 172, 162 and 192 tends to produce a positive signal on the output line 76 and thereby on the input terminal 72 of the reversible amplifier 40. As stated before, this would tend to drive the motor 28 in the hoist direction. On the other hand, a negative signal at any of the input summing terminals 172, 162 and 192 will tend to produce a negative signal at the line 76 and thereby at the input terminal 72 of the amplifier 40, tending to drive the hoist motor 28 in the lowering direction. The input signals on terminals 162, 172 and 192 are summed so that the output of the amplifier is a resultant of the summation plus the integral of the summation.

The output shaft of the hoist motor 28 is provided with an electrically releasable spring set shoe brake 220 which remains set while the master controller handle 160 is in neutral or a switch 222 is in the open position. However, when the controller 160 is moved to either the hoist or the lower position, the brake energizing circuit 224 connected to the brake 220 energizing coil is closed by one or the other of a pair of drum switch segments 226 and 228 which are adapted to short a set of contacts 230 in the brake energizing circuit. The circuit includes a relay 232 and a battery 234, which operates the relay 232 in response to either closing of switch 222 or the shorting of contacts 230 by the drum switch segments. In response to operation of relay 232 relay contacts 236 are closed to energize the brake coil with battery 234 voltage thereby releasing the brake.

Switches 174 and 222 are ganged to open and close together in response to the movement of a lever 240, which when moved to MAN. (manual) position opens switches 222 and 174, and when moved to AUTO. (automatic) position closes these switches. In the manual position of lever 240, the brake energizing circuit is open as long as controller handle 160 is in the neutral position. Also in the manual position of handle 240, switch 174 being open, the ship's motion reference signal is not injected into the summing circuit. Operating under these conditions, only the command signal A from the command source 140 and the actual speed signal B from the tachometer 142 are differentially combined in the summing circuit to produce a regulating error signal which controls the reversible power source 32 to regulate the speed of the load with reference to the crane 10. In this operation, to lower or hoist the controller handle 160 must be moved to lower or hoist position.

*Operation without the ship's motion reference*

As hereinbefore stated the command or desired speed reference signal A from the command source 140 for any given command direction is opposed in the summing circuit 42 by the actual motor speed signal B produced by the tachometer 142. The magnitude and polarity of the command signal A from the command source 140 is dependent on the desired speed and direction of the command. The magnitude and polarity of the output of tachometer 142 is dependent on the speed and direction of rotation of the hoist motor 28. Thus the command signal A is proportional to the desired speed of load while the actual speed signal from tachometer 142 is proportional to the speed of the hoist motor and thereby to the actual speed of the load relative to the crane.

To raise the load 14, the master control handle 160 is moved into the hoist sector of the controller range to a selected position corresponding to the desired speed. Movement of the handle 160 into the hoist sector moves the drum switch 164 and the potentiometer arm 158 in unison to the right or the hoist sector of the controller. In this sector, the potentiometer arm 158 taps into the "positive" side of the potentiometer 150 to provide a positive polarity command signal A to the summing input of the amplifier 42, the magnitude of the signal corresponding to the selected command speed. This drives the output of amplifier 42 positive at terminal 202 and positive at the input terminal 72 of the reversible amplifier 40, thereby turning the hoist amplifier 82H on and turning the lowering amplifier 82L off, thus energizing the generator main field winding 38 to drive the hoist motor 28 in the hoist direction. As the speed of the hoist motor increases, the output voltage of the tachometer 142 which is opposed to the command signal, increases until equilibrium is reached, wherein enough excitation is supplied to the motor to produce the requisite torque to maintain the selected command speed.

If for any reason the motor 28 should run faster than the command speed, the tachometer 142 voltage will be greater than the command signal A and the polarity of the resulting error signal will be such as to apply positive voltage to the input terminal 70 of the reversible amplifier 40. This results in the lowering amplifier 82L being driven on and the hoist amplifier 82H being driven off, the net result being an application of regenerative braking, thus slowing the motor down until equilibrium is reached at the proper speed and torque.

To lower the load, the command signal A is reversed in polarity by moving the master control handle 160 to the lowering sector, thus moving the potentiometer arm 158 to that side of the potentiometer which will provide a negative signal to the terminal 162 of the summing circuit thus providing a negative signal at input terminal 72 of reversible amplifier 40 to drive the lowering amplifier 82L on and the hoist amplifier 82H off, thereby to rotate the motor in the lowering direction.

In the lowering direction, tachometer 142 produces an output voltage which is positive at the terminal 172 thereby opposing the command signal A which for the lowering direction is negative. As the speed of the load increases in the lowering direction, the tachometer 142 output voltage increases. If the lowering of the load tends ot overhaul the motor, the tachometer 142 voltage will exceed the command signal A thereby causing amplifier 42 to produce an output which tends to drive the hoist amplifier 82H on and the lowering amplifier 82L off to provide sufficient regenerative torque to keep the overhauling load at the command speed.

In this mode of operation (lever 240 in the manual position) the load movement is maintained at a constant speed relative to the crane 22 and dock 12 for a given command speed. Although the load speed is constant relative to the crane and crane support (active station), the speed of the load relative to to the ship (passive station) is undesirably variable due to the rise and fall of the ship because of wave action.

*Operation with the ship's motion signal*

To substantially eliminate the effect of the ship's motion, the ship's motion reference signal C from the tachometer 144 is added to the summing circuit 42 by closing switch 174.

As hereinbefore stated, the polarity relation of the ship's motion reference circuit 144 to the rest of the summing circuit is such that the command signal A from the desired speed reference source 140 and the ship's motion signal C from the ship's motion reference source 144 in the mutually aiding relation when the direction of relative movement between the ship and the crane is opposite to the commanded direction of relative movement between the load and the ship. In other words, for this circumstance, the signals A and C have similarly sensed control effect on the control system 30. On the other hand, signals A and C are in mutually opposing relation providing oppositely sensed control effects on the control system 30 when the relative movement between the ship and the crane is in the same direction as the commanded relative movement between the load and the ship. For example, when the ship is rising, that is, when the direction of the relative movement between the ship and the crane is in the closing direction, the ship's motion tachometer 144 provides a positive output on terminal 192 of the summing circuit. However, when the ship is falling that is, when the relative movement between the ship and the crane is in the opening direction, the output of the ship's motion tachometer 144 is negative at terminal 192.

The operation of the crane example will now be considered in more specific detail. Suppose that a load is to be transferred from the dock to the ship. With the lever 240 in the manual position (switches 174 and 222 open), the crane operator swings the crane 22 around its vertical pivot to a position over the load on the dock. The load is hooked to the line 18 and the crane operator raises the load by operating the master control 160 to the hoist side. This releases the brake 220 and hoists the load. At a particular hoisted position, the load may be held by moving the control 160 to neutral thereby setting the brake and setting the command signal A at zero voltage whereby the regulator regulates for zero speed. The crane is then swung around its vertical pivot to position the load over the ship. At this time, the tag line 182 may be unwound from the drum 176 and lowered to the ship's deck by proper use of a reversing switch 250 in the supply lines of motor 180. Once the line 182 is "fixed" to the ship's deck, the reversing switch 250 is operated to reverse the motor 180 and the torque motor control circuits are adjusted to apply just enough torque to maintain constant tension on the line 182. In a wound rotor motor, this adjustment may be made by adjusting the secondary resistance. Next the operator moves lever 240 to the automatic position thereby closing switches 174 and 222. The drive system now will follow the ship's motion signal and maintain a constant distance between the load and the ship. A special use of the invention may be for this purpose alone, that is, to hold the position of a load constant with respect to the passive station. For example the load may be an object carried by a ship, which object needs to be held in constant position relative to the sea bottom.

In order to lower the load to the ship's deck, the crane operator moves the master control 160 to the lowering side to provide a lowering command signal A which is negative at the input terminal of the summing amplifier. The ultimate result is to drive the lowering amplifier 82L on and cause the hoist motor 28 to rotate in the lowering direction. As the load starts to move down, the speed feedback tachometer 142 puts out a positive signal at the input terminal 172 to the summing circuit which opposes the command signal A. If in the meantime the ship is rising, the ship's movement tachometer 144, generates a positive signal at the input terminal 192 to the summing circuit which opposes the command signal and forces the drive to run slower. If, as the ship is rising, the ship's movement tachometer signal C exceeds the command signal A, the load will actually be hoisted. On the other hand, if, as the load is being lowered, the ship is falling, the ship's movement tachometer 144 output signal C will be negative at the input terminal thus aiding the command signal A thereby causing the drive to lower faster. Thus the application of the ship's motion signal C to the regulating loop regulates the drive to maintain not only a constant speed between the load 14 and the ship 16 for any selected command speed but also, due to the integrating feedback circuit 44, it regulates the drive to maintain a correct instantaneous position between the load and the ship.

When it is desired to lift the load from the ship, the crane operator moves the master controller 160 to the hoist position applying a positive command signal to the summing circuit thereby driving the hoist amplifier 82H on and causing the hoist motor 28 to rotate in the hoist direction.

As the load rises, the speed feedback tachometer 142 generates a negative signal to the summing circuit at terminal 172, tending to cancel the command signal A to keep the drive at a constant speed relative to the dock. If the ship rises as the load is being hoisted, the ship's movement tachometer 144 generates a positive signal at the summing circuit input terminal 192, thus aiding the command signal and forcing the drive to hoist faster, thereby to maintain constant hoisting speed between the load 14 and the ship 16.

As seen from the description herein, the present invention makes the motor 28 hoist or lower at a speed necessary to keep the load moving with respect to the ship, at the speed set by the master control 160 regardless of the up and down movement of the ship.

It should be noted that the summation of the reference command signal A, the actual speed signal B and the ship's motion signal C produces an error signal which is responsive to the difference between the actual and desired speeds of relative movement between the load 14 and the ship 16 (passive station). Additionally, the integrating arrangement 44 provides the integral of the difference between the actual and desired speeds of relative movement between the load and the passive station, thus providing a regulating signal with both speed and position error components on the output lines 74 and 76, by which the drive system is controlled.

Although above water stations have been illustrated, the invention is also very useful in the case where a hoist on a vessel floating on the surface of the water lowers and hoists objects to and from an underwater station such as the bottom of the sea, an underwater structure, or any selected underwater reference level. The invention helps to reduce the effects of sudden load changes on the hoist equipment due to the friction or retarding effects of the water on the load as the ship rises and falls with the waves or swells.

The invention is not limited to hoists, but may be used for other purposes, for example to hold a load (any object), that is movable by appparatus on an active station, to a desired instantaneous position relative to a passive station when relative movement is going on between the stations. In such a case the value of the desired velocity of relative movement between the load and the passive station is zero.

The invention is not limited to the particular reversible drive and control therefor shown by way of example. Other suitable reversible drives and controls therefor may be employed in practicing the invention. Likewise the ship's motion signal 192 may be obtained by other suitable apparatus, for example, gyroscopic systems, sonar systems, radar, or any other apparatus which will provide a signal responsive to the relative movement between two bodies. Thus, it is to be understood that the hereindescribed arrangements are simply illustrative of the principles of the invention, and other embodiments and fabrications are within the spirit and scope of the invention.

We claim as our invention:

1. In apparatus for maneuvering a load between two stations which are subject to relative movement between each other, and wherein there is an adjustable speed reversible drive means for moving the load, said drive means including motor means located on one of said stations for moving the load, the combination therewith of first control means responsive to the difference between actual and desired speeds of relative movement between the load and the other station for producing a first signal component proportional to that difference, second control means responsive to the difference between actual and desired instantaneous positions of the load relative to the other station for producing a second signal component proportional to the last said difference, and means coupled to said drive means and to said first and second control means for controlling said drive means in response to said first and second signal components to maintain a desired speed of relative movement between the load and the other station while relative movement is going on between said stations.

2. In apparatus for maneuvering a load between two stations which are subject to relative movement between each other, and wherein there is an adjustable speed reversible drive means for moving the load, said drive means including motor means located on one of said stations for moving the load, the combination therewith of control means for controlling said drive means, said control means comprising means providing a first signal proportional to the difference between actual and desired speeds of relative movement between the load and the other station, means responsive to said first signal for producing a second signal which is proportional to the first signal and the integral thereof, and means responsive to said second signal for causing said drive means to maintain a desired speed of relative movement between the load and the other station.

3. In apparatus for maneuvering a load between two stations which are subject to relative movement between each other, and wherein there is an adjustable speed reversible drive means for moving the load, said drive means including motor means located on one of said stations for moving the load, the combination therewith of means for providing a command signal A indicative of a desired speed and direction of movement of said load relative to the other of said stations, means for providing a signal B dependent on the actual speed of the load relative to said one station, means for providing a signal C dependent on the speed and direction of said relative movement between said stations, a summing circuit in which said signals A, B and C are summed to produce a signal component D representing the difference between actual and desired speeds of relative movement between the load and said other station, integrating means responsive to said signal component D for producing a signal component E representing the integral of said signal component D, and means responsive to said signal components D and E for controlling said drive means to maintain said desired speed and direction of movement of said load relative to said other station.

4. In apparatus for maneuvering a load between two stations which are subject to relative movement between each other, and wherein there is an adjustable speed reversible drive means for moving the load, said drive means including motor means located on one of said stations for moving the load, the combination therewith of means for providing a command signal A indicative of a desired speed and direction of movement of said load relative to the other of said stations, means for providing a signal B dependent on the actual speed of the load relative to said one station, means for providing a signal C dependent on the speed and direction of said relative motion between said stations, a summing circuit in which said signals are summed to produce a signal summation proportional to the difference between the actual and desired speeds of relative movement between said load and said other station, circuit means coupled to said summing circuit and responsive to said signal summation for producing an output having a component proportional to said summation and a component proportional to the integral of said summation, and means coupled to said circuit means and said drive means for controlling said drive means in response to said output of said circuit means to maintain said desired speed and direction of movement of said load relative to the other of said stations.

5. In apparatus for maneuvering a load between two stations which are subject to relative movement between each other, and wherein there is an adjustable speed reversible drive means for moving the load, said drive means including motor means located on one of said stations for moving the load, the combination therewith of means for providing a command signal A indicative of a desired speed and direction of movement of said load relative to the other of said stations, means for providing a signal B dependent on the actual speed of the load relative to said one station, means for providing a signal C dependent on the speed and direction of said relative motion between said stations, an operational amplifier having an integrating feedback circuit therearound and a summing input to which said signals are applied, said summing input providing a signal summatoin that is proportional to the difference between the actual and desired speeds of relative movement between the load and said other station, said amplifier providing an output that is proportional to said summation and the integral of said summation, and a control cricuit coupled to said amplifier and to said drive means and responsive to said amplifier output for operating said drive means to maintain said desired speed and direction of said load relative to said other station.

6. In apparatus for maneuvering a load between two stations which are subject to relative movement between each other, and wherein there is an adjustable speed reversible drive means for moving the load, said drive means including motor means located on one of said stations for moving the load, the combination therewith of means for providing a command signal A indicative of a desired speed and direction of movement of said load relative to the other of said stations, means for providing a signal B dependent on the actual speed of the load relative to said one station, means for providing a signal C dependent on the speed and direction of said relative motion between said stations, an integrating summing circuit having an output circuit and an input circuit to which said signals are applied, said integrating summing circuit being arranged to produce an output which is proportional to both the summation of the signals applied to its input and the integral of that summation, and control means coupled to said drive means and the output circuit of said integrating summing circuit and responsive to said output of the integrating summing circuit for operating said drive circuit to maintain said desired speed and direction of movement of said load relative to said other station.

7. In apparatus for maneuvering a load between two stations which are subject to relative movement between each other, and wherein there is an adjustable speed reversible drive means for moving the load, said drive means including motor means located on one of said stations for moving the load, the combination therewith of means for providing a command signal A indicative of a desired speed and direction of movement of said load relative to the other of said stations, means for providing a signal B dependent on the actual speed of the load relative to said one station, means for providing a signal C dependent on the speed and direction of said relative movement between said stations, a control network that includes summing means and integrating means and provides an output which is proportional to the summation of its input signals and the integral of that summation, means for applying said signals A, B and C as input signals to said control network in such relation that said summation produced by said control network is proportional to the difference between actual and desired speeds of relative movement between said load and said other station, and means coupled to said control network and to said drive means for controlling said drive means in response to said output of the control network to maintain said desired speed and direction of movement of said load relative to said other station.

8. In apparatus for maneuvering a load between two stations which are subject to relative movement between each other, and wherein there is an adjustable speed reversible drive means for moving the load, said drive means including motor means located on one of said stations for moving the load, the combination therewith of means for providing a signal B dependent on the actual speed of the load relative to said one station, means for providing a signal C dependent on the speed and direction of said relative motion between said stations, a control network that includes summing means and integrating means and provides an output which is proportional to the summation of its input signals and the integral of that summation, means for applying said signals B and C as input signals to said control network, and means coupled to said control network and said drive means for controlling said drive means in response to said output of the control network.

9. In apparatus for maneuvering a load between two stations which are subject to relative movement between each other, and wherein there is an adjustable speed reversible drive means for moving the load, said drive means including motor means located on one of said stations for moving the load, the combination therewith of means for providing a signal B dependent on the actual speed of the load relative to said one station, means for providing a signal C dependent on the speed and direction of said relative motion between said stations, a summing circuit in which said signals are summed, said summing circuit producing a summation signal representing the sum of signals B and C, integrating means coupled to said summing means for producing an integration signal representing the integral of said sum, and control means responsive to said summation and integration signals for operating said drive means.

10. In apparatus for maneuvering a load between two stations which are subject to relative movement between each other, and wherein there is an adjustable speed reversible drive means for moving the load, said drive means including motor means located on one of said stations for moving the load, the combination therewith of means for providing a signal B dependent on the actual speed of the load relative to said one station, means for providing a signal C dependent on the speed and direction of said relative motion between said stations, an operational amplifier having an integrating feedback circuit therearound and a summing input to which said signals are applied, said operational amplifier being arranged to provide an output that is proportional to its input and to the integral of its input, and a control circuit coupled to said amplifier and said drive means and responsive to said amplifier output for operating said drive means.

11. The combination as in claim 3, wherein said signals are related as follows: signal B is negative feedback relative to signal A, signals A and C aid each other when the relative movement between said stations is opposite to the commanded relative movement between the load and said other station; and signals A and C oppose each other when the relative movement between said stations is in the same direction as the commanded relative movement between the load and said other station.

12. The combination as in claim 5, wherein said signals are related as follows: signal B is negative feedback relative to signal A, signals A and C aid each other when the relative movement between said stations is opposite to the commanded relative movement between the load and said other station, and signals A and C oppose each other when the relative movement between said stations is in the same direction as the commanded relative movement between the load and said other station.

13. The combination as in claim 7, wherein said signals are related as follows: signal B is negative feedback relative to signal A, signals A and C aid each other when the relative movement between said stations is opposite to the commanded relative movement between the load and said other station, and signals A and C oppose each other when the relative movement between said stations is in the same direction as the commanded relative movement between the load and said other station.

References Cited by the Examiner
UNITED STATES PATENTS

| | | | |
|---|---|---|---|
| 709,915 | 9/02 | Leonard | 214—13 |
| 709,916 | 9/02 | Leonard | 214—13 |
| 2,293,936 | 8/42 | Crooke | 212—3 X |
| 2,832,024 | 4/58 | Wickerham | 318—229 |
| 2,854,154 | 9/58 | Hepinstall | 214—14 |
| 2,946,466 | 7/60 | Weiner | 214—14 |
| 3,088,710 | 5/63 | Evans et al. | 254—172 |

HUGO O. SCHULZ, *Primary Examiner.*

GERALD M. FORLENZA, *Examiner.*